Oct. 26, 1943. L. A. M. BARNETTE ET AL 2,332,773
INDICATOR FOR RECURRING MOTION
Filed March 15, 1941

William A. Pitts
Louis A. M. Barnette  INVENTORS
BY P. J. Whelan
ATTORNEY

Patented Oct. 26, 1943

2,332,773

UNITED STATES PATENT OFFICE 2,332,773

INDICATOR FOR RECURRING MOTION

Louis A. M. Barnette and William A. Pitts, Houston, Tex., assignors to Standard Oil Development Company, a corporation of Delaware Application March 15, 1941, Serial No. 383,650

10 Claims. (Cl. 175—368)

The present invention is directed to a device for indicating the average frequency of a recurring motion during a fixed period of time.

An object of the present invention is to devise a means for indicating the average rate of frequency of an object having a recurring motion.

More specifically, it is an object of the present invention to devise a means of indicating the average number of straight line recurring movements given an object over a predetermined period of time. As an example, it is desired to devise a means capable of indicating the average number of strokes per minute being given a reciprocating pump rod by a pump having no rotating parts.

Other objects and advantages of the present invention may be seen from a reading of the following description taken in conjunction with the drawing in which Fig. 1 is a diagrammatic illustration of an embodiment of the present invention;

Figure 1:
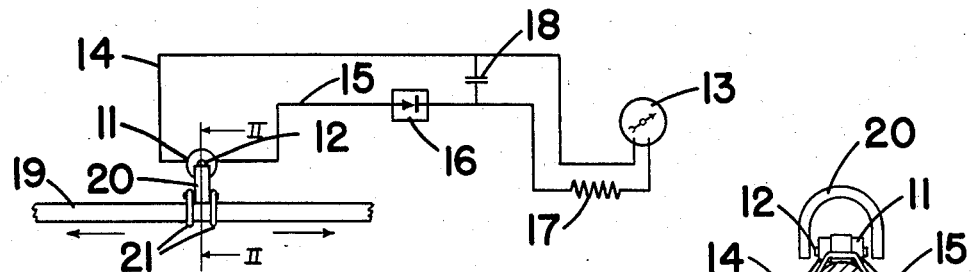
Figure 2:
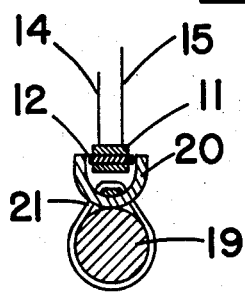
Fig. 2 is a view taken along line II—II of Fig. 1.

Referring first to the embodiment illustrated in Figs. 1 and 2, a coal 11 provided with a core 12 of a suitable magnetically permeable material is elctrically connected to a direct current ammeter 13 by means of suitable electrical conductors 14 and 15. Conductor 15 has inserted therein a suitable rectifier 16 such as a copper oxide rectifier and a relatively high resistance 17. A large capacity condenser 18 has one plate connected to conductor 14 and the other plate connected to conductor 15, at a point between rectifier 16 and resistance 17.

A reciprocating part 19, such as a piston rod, the average frequency of motion of which is to be indicated, has secured to it a permanent U-shaped magnet 20 by a suitable clamp 21.

The preferred method of arranging permanent magnet 20 and coil 11 is with the axis of the coil arranged laterally with respect to the path of reciprocating part 19, and U-shaped magnet 20 arranged so that the poles of the magnet simultaneously move past the ends of core 12 during each stroke of the reciprocating part. It will be understood that in accordance with the laws of electricity the movement of the poles of the magnet 20 past coil 11 in one direction induces an electrical pulse in the coil with the pulse flowing in one direction, and that the reverse movement of the magnet induces an electrical pulse in the direction opposite to the first pulse. Rectifier 16 allows only the pulses flowing in one direction to pass, thereby eliminating half of the pulses and causing a unidirectional current in the portion of the circuit including ammeter 13, resistance 17, and condenser 18. When a pulse passes to this end of the circuit, its effect is divided, a portion of it going to charge condenser 18, and another portion passing through resistance 17 to ammeter 13. By selecting unit 17 so that it has a large resistance and condenser 18 so that it has a large capacity, a portion of each pulse immediately passing to ammeter 13 may be reduced to a small amount, and the remainder of the pulse will go to charge condenser 18. The condenser discharges slowly through the ammeter giving a substantially constant reading of the ammeter when the reciprocating part 19 moves magnet 20 past coil 11 a constant number of times in a given time interval. In other words, the combination of resistance 17 and condenser 18 acts to store up the energy of the pulses and to discharge it slowly through the ammeter.

The rectifier 16 in the circuit serves two purposes. Generally coil 11 has a great deal less resistance than the resistance 17 so that, if rectifier 16 were not in the circuit, condenser 18 would discharge very rapidly through the loop including coil 11, and the reading of meter 13 would fluctuate widely. The other purpose served by rectifier 16 consists in eliminating the pulses which are in the opposite direction to those passed by the rectifier. If these alternate pulses were not eliminated, they would in themselves discharge condenser 18 and there would be little energy available to discharge through the ammeter. It is preferred to arrange the movement of the magnet and the coil so that at the end of each reciprocation the field of the magnet will substantially be out of the range of the coil. With this arrangement the usual changes in length of strokes encountered in pumps does not change the indications obtained by the device.

Figure 3:
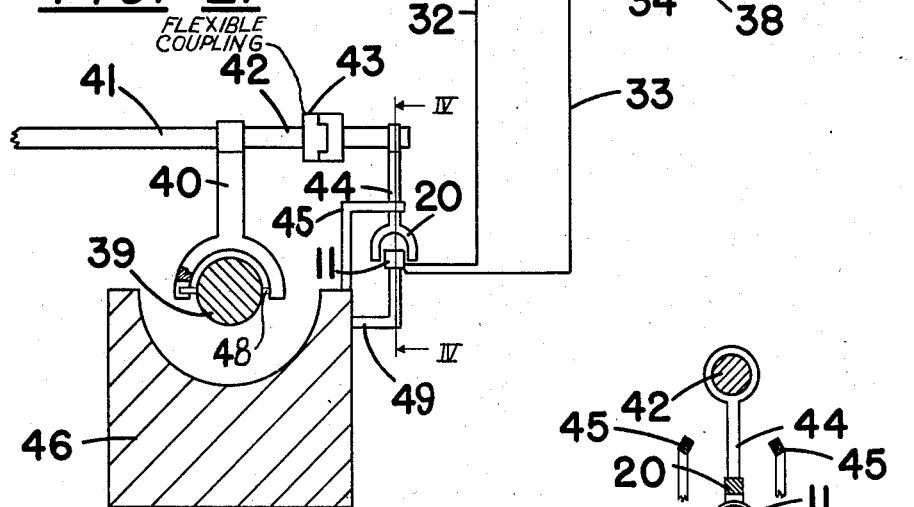
Fig. 3 is a diagrammatic illustration of another embodiment of the present invention.
Figure 4:
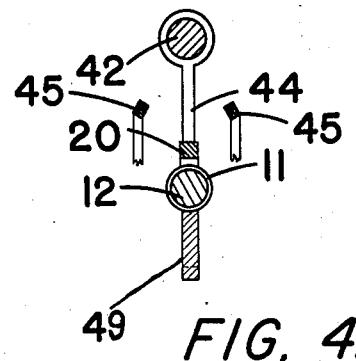
Fig. 4 is a view taken along line IV—IV of Fig. 3.

Another embodiment of the present invention is illustrated in Figs. 3 and 4. Here, the parts corresponding to Fig. 1 are given corresponding numbers. Coil 11 is electrically connected to full wave rectifier 31 by conductors 32 and 33. Full wave rectifier 31 may suitably be a bridge containing copper oxide rectifiers in the arms thereof, as is well known in the art, and is arranged to rectify into unidirectional pulses current pulses occurring in opposite directions. The output from rectifier 31 is electrically connected to ammeter 13 by conductors 34 and 35. Connected across conductors 34 and 35 are condensers 36 and 37. Arranged in conductor 34 between the points of attachment of leads to condensers 36 and 37 is a relatively high resistance 38.

A reciprocating part 39, such as a piston rod, is provided with pin 48 arranged to operate the rocker arm 40 which oscillates on a shaft 41. Many pumps are provided with such an oscillating rocker arm for operating the valve gear and such mechanism may conveniently be used in applying the present invention. Extension 42 of the rocker arm shaft provided with a flexible coupling 43 for eliminating unnecessary vibration is provided with a downwardly extending arm 44 having secured to the end thereof permanent magnet 20.

It will be evident that with every stroke of rod 39 in the embodiment illustrated in Fig. 3 magnet 20 will be given a corresponding movement. The motion of reciprocating rod 39 is in a straight line, and the motion of magnet 20 is arcuate, the straight line motion of the rod in either direction producing a corresponding arcuate motion in magnet 20. Stops 45, 45 limit the movement of magnet 20. These stops include a space no greater than the expected minimum movement to be given the magnet by piston rod 39, any additional movement being absorbed by flexible coupling 43. This arrangement allows a shorter movement of the magnet since the coil may remain in the field of the magnet at the ends of the strokes.

Coil 11 is arranged in the same relative position with respect to magnet 20 in the embodiment illustrated in Fig. 3 as it is in Fig. 1. In both cases the coil is arranged so that motion of the magnet causes the ends of the magnet to move across the ends of the coil simultaneously. In the embodiment illustrated in Fig. 3, however, each pulse produced is passed by full wave rectifier 31 to the remaining portion of the circuit, and the amount of electric power flowing through the indicating means is approximately doubled over that produced by the first described embodiment.

Bracket 49, secured to frame 46 of the machine containing reciprocating rod 39, supports core 12 having coil 11 arranged thereon.

Figure 5:
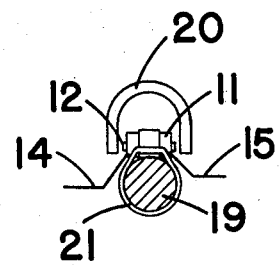
Fig. 5 is a fragmentary view showing another arrangement of the present invention.

As a further embodiment of the present invention the coil may be given motion with the magnet arranged in a fixed position along the path of motion of the coil. Such an embodiment is illustrated in Fig. 5 which is a fragmentary view of a device having parts corresponding to the device of Figs. 1 and 2, but in which coil 11 is secured to reciprocating part 19 by clamp 21 so that it reciprocates, while magnet 20 remains stationary.

In actual construction of the devices it has been found that a resistance of 10,000 ohms is satisfactory as unit 17 of the embodiment in Fig. 1 and as unit 38 in the embodiment of Fig. 3. A microammeter indicating from 0 to 50 units is suitable for unit 13. A condenser having a capacity of 2000 microfarads may be used as unit 18 in Fig. 1, and condensers having a capacity of 1000 microfarads each are used as units 36 and 37 in Fig. 3.

Using the sizes above indicated, the devices have been found capable of indicating reciprocations ranging from 5 to 80 per minute. The device illustrated in Fig. 3 is slightly easier to read than that shown in Fig. 1 because it is free from a slight fluctuation which appears in the indicating means used in Fig. 1. If desired, a damped meter may be used in constructing the apparatus, particularly the embodiment illustrated in Fig. 1.

While the devices have been described for indicating the recurring motion of a reciprocating object, it will be evident that they may be used for indicating the periodic motion of a rotating body. If such is desired, the magnet is attached to the rotating part and arranged to pass by the coil.

The devices described above, however, are particularly useful for indicating the frequency of reciprocating parts, such as pumps in which the speed of the reciprocating part may vary considerably without changing the number of strokes per unit of time. It often occurs, for example, that a pump will run with a pause at the end of each stroke but with a rapid movement of the pump shaft during the stroke. Such an irregular motion does not affect the reading obtained by the device described because an increase in the speed with which the magnet passes by the coil, causes the pulse induced to have a higher potential, but less duration so that the power transmitted is effectively the same regardless of the speed with which the magnet moves past the coil, and the arrangement of the resitors and condensers smoothes out the irregularities.

While we have described specific embodiments of the present invention, it will be apparent that various changes may be made in the shape, size and arrangement of parts without departing from the scope of the invention. It is accordingly not our intention to be bound by the specific embodiments described, but to claim the invention broadly.

We claim:

1. An average rate frequency indicating device comprising, in combination, a permanent magnet adapted to be given a recurrent motion corresponding to that of an object the frequency of which is to be indicated, a coil mounted adjacent the path of the magnet whereby an electrical pulse is induced in said coil during each recurring motion of said magnet, conductors connecting the ends of said coil to a current indicating device, a rectifier and a relatively large resistance serially arranged in one of said conductors, and a relatively large capacity condenser having one plate connected to said last mentioned conductor at a point between said rectifier and said resistance, and the other plate connected to said other conductor.

2. A device for indicating reciprocating motion comprising, in combination, a U-shaped magnet, mechanical means linking said magnet with a reciprocating object whereby for each reciprocating stroke given the object a corresponding motion is given said magnet, said magnet being arranged so that a line connecting the poles is at right angles to the motion of said reciprocating part, a coil of wire of less length than the distance between the poles of said magnet arranged in the path of said magnet whereby the poles of said magnet pass by the ends of said coil simultaneously, a current indicating device, conductors connecting said coil with said current indicating device, a relatively large resistance in one of said conductors, a condenser connected across said conductors so that current passing from said condenser to said current indicating device passes through said resistance, and a rectifier arranged in said circuit between said coil and the point at which said condenser is connected to said conductors.

3. A device for indicating the average frequency of an object having a reciprocating motion comprising, in combination, a permanent U-shaped magnet, a clamp for attaching said magnet to a reciprocating part so that a line connecting the poles of said magnet is at right angles to the direction of motion of said reciprocating part, a coil of wire, a magnetically susceptible core arranged in said coil, said core being longer than said coil and shorter than the distance between the inside of the poles of said magnet, said coil being arranged along the path given said magnet by said reciprocating part so that the poles of said magnet pass by the ends of said core simultaneously, electrical conductors connecting the ends of said coil to a current indicating device, one of said conductors containing a rectifier and a relatively high resistance, a relatively large condenser having one plate connected to one conductor and the other plate to the other conductor with the point of attachment to the conductor containing the rectifier and resistance between said rectifier and resistance.

4. A device for indicating the average frequency of a reciprocating object comprising, in combination, a rocker arm arranged to be operated by said object, an arm mechanically linked to said rocker arm and parallel therewith, a permanent U-shaped magnet attached to said arm so that a line connecting the poles of said magnet extends at right angles to the motion given said reciprocating object, a core of a magnetically susceptible metal arranged within said coil having its end extending beyond the ends of said coil, said core being of lesser length than the distance between the poles of said permanent magnet, means of securing said coil in the path of said magnet whereby the poles of said magnet pass the ends of said core simultaneously, conductors connecting the ends of said coil with a full wave rectifier, conductors connecting said full wave rectifier with a current indicating device, one of said last mentioned conductors containing a resistance, a plurality of condensers connected across said last mentioned conductors, one of said condensers being connected between said resistance and said rectifier and the other connected between said resistance and said current indicating device.

5. A device for indicating the average rate frequency of a reciprocating object comprising, in combination, a permanent magnet, a coil, a current indicating device, conductors connecting said coil with said current indicating device, a rectifier electrically arranged between said coil and said indicating device, a condenser connected across the said conductors in parallel with said indicating device at a point between said rectifier and said indicating device, said coil and magnet being arranged for relative movement proportional to the frequency of reciprocation of said object.

6. A device in accordance with claim 5 in which said condenser has a relatively large capacity.

7. A device for indicating the average rate frequency of a reciprocating object, comprising in combination, a permanent magnet, a coil and a current indicating meter electrically connected with said coil to form a closed circuit, said circuit including a rectifier, a relatively large capacity condenser connected in parallel with said meter, and between said meter and said rectifier, and a relatively large resistance arranged between said rectifier and said meter in series with said meter, said coil and magnet being arranged for relative movement proportional to the frequency of said object.

8. A device in accordance with claim 7 in which said rectifier is a full wave rectifier.

9. A device in accordance with claim 7 in which said coil is arranged to be given motion corresponding to the frequency of the object.

10. A device in accordance with claim 7 in which said magnet is arranged to be given motion corresponding to the frequency of the object.

LOUIS A. M. BARNETTE.
WILLIAM A. PITTS.